United States Patent
Redkoles

(10) Patent No.: US 11,232,715 B2
(45) Date of Patent: Jan. 25, 2022

(54) FLIGHT SIMULATOR AND METHOD OF USE

(71) Applicant: THE BOEING COMPANY, Chicago, IL (US)

(72) Inventor: Paul Lee Redkoles, Mullica Hill, NJ (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 15/929,853

(22) Filed: May 26, 2020

(65) Prior Publication Data

US 2020/0286399 A1 Sep. 10, 2020

Related U.S. Application Data

(63) Continuation of application No. 15/715,306, filed on Sep. 26, 2017, now Pat. No. 10,685,583.

(51) Int. Cl.
| | | |
|---|---|---|
| *G09B 9/30* | (2006.01) | |
| *G09B 9/08* | (2006.01) | |
| *G06F 3/14* | (2006.01) | |
| *G09B 9/32* | (2006.01) | |

(52) U.S. Cl.
CPC ........... *G09B 9/302* (2013.01); *G06F 3/1423* (2013.01); *G09B 9/08* (2013.01); *G09B 9/32* (2013.01)

(58) Field of Classification Search
CPC ................................ G06F 3/1423; G09B 9/08
See application file for complete search history.

(56) References Cited

U.S. PATENT DOCUMENTS

| | | | |
|---|---|---|---|
| 6,134,514 A | * | 10/2000 | Liu ........................ H04L 41/145 703/17 |
| 6,261,100 B1 | | 7/2001 | Bragdon |
| 7,406,050 B2 | | 7/2008 | Calluaud et al. |

(Continued)

FOREIGN PATENT DOCUMENTS

| | | |
|---|---|---|
| CN | 103809581 A | 5/2014 |
| KR | 958373 B1 | 5/2010 |

(Continued)

OTHER PUBLICATIONS

Acutronic (company website), ACUTROL 3000e Controller, PDF of webpage acquired Sep. 28, 2017, 2 pgs. URL: http://www.acutronic.com/fileadmin/cms_files/AUS_DS/Datasheet-Digital-Motion-Controller-ACUTROL3000e-AUS.pdf.

(Continued)

*Primary Examiner* — Shean Tokuta
(74) *Attorney, Agent, or Firm* — Armstrong Teasdale LLP

(57) ABSTRACT

A processing system for a flight simulator includes a non-transitory memory and a processor. The non-transitory memory is configured to store computer-executable instructions for a host process and a ScramNet-to-Ethernet application programming interface (API). The processor is communicatively coupled to a ScramNet interface and the non-transitory memory, and is configured to execute the host process and the ScramNet-to-Ethernet API to: convert, using the ScramNet-to-Ethernet API, a user interface message to a first ScramNet message on the ScramNet bus, process, using the host process, the first ScramNet message to generate a second ScramNet message on the ScramNet bus.

20 Claims, 4 Drawing Sheets

(56) References Cited

U.S. PATENT DOCUMENTS

| 8,827,709 | B1* | 9/2014 | Gurule | G09B 9/02 |
| | | | | 434/59 |
| 9,482,552 | B2 | 11/2016 | Dabrowski et al. | |
| 2004/0122637 | A1 | 6/2004 | Askew et al. | |
| 2017/0236431 | A1 | 8/2017 | Delisle | |
| 2019/0096275 | A1* | 3/2019 | Redkoles | G06F 3/1423 |

FOREIGN PATENT DOCUMENTS

| KR | 100968373 B1 | 5/2010 |
| KR | 1445669 B1 | 11/2014 |

OTHER PUBLICATIONS

European Search Report regarding European Patent Application No. 18195641.8-1222 dated Nov. 22, 2018; pp. 1-8.
Gaomin, Lee et al., "An Integrated Platform For Aircraft Design: Flight Engineering Simulator", ICAS 2006, 25th International Congress of the Aeronautical Sciences, Dec. 31, 2006, pp. 1-8.

* cited by examiner

FLIGHT SIMULATOR AND METHOD OF USE

CROSS-REFERENCE TO RELATED APPLICATIONS

This application is a Continuation of U.S. patent application Ser. No. 15/715,306 filed on Sep. 26, 2017, the entire contents of which are hereby incorporated herein by reference.

FIELD

The field of the disclosure relates generally to flight simulation and, more specifically, to a flight simulator that utilizes both ScramNet protocols and Ethernet protocols, and methods of use.

BACKGROUND

Many known flight simulators include large static installations of aircraft cockpits, with flight controls, displays, instrumentation and other pilot interfaces, and out-the-window (OTW) displays. In some instances the aircraft cockpits include high-fidelity simulated hardware or actual flight hardware integrated into the flight simulation. Such hardware may include, for example, tactical displays, multifunction displays (MFDs), instrumentation, alert and warning indicators, heads-up displays (HUDs), flight controls, communication systems, and other avionics systems. Likewise, some flight simulators include high-fidelity OTW display systems including, for example, curved-screen projection systems, multi-panel display systems, or dome projection systems. High-fidelity flight simulators enable training, testing, and marketing of complex aircraft without the expense of actual flight time in actual aircraft, although such flight simulators are generally dedicated to a particular aircraft.

Flight simulators, static and mobile, generally include at least one processing system, e.g., a computer, that executes flight simulation software for controlling various pilot interfaces, including, for example, flight controls and various displays. Many high-fidelity flight simulators include multiple processing systems respectively dedicated to controlling one or more subsystem of the flight simulator. For example, a flight simulator may include one or more dedicated processing systems for controlling OTW displays, another processing system for controlling a cockpit display, such as, for example, an MFD or tactical display, and yet another processing system for controlling flight controls, such as, for example, a stick and throttle. Each of such processing systems executes a portion of flight simulation software, or simulation processes, for its dedicated purpose or function. At the core of the flight simulation software is a host process that coordinates among all other simulation processes, whether they are executed on a single processing system or distributed among multiple processing systems. The host process may include, for example, a math model that processes various inputs, such as, for example, flight control inputs and wind, to compute various outputs, or aircraft parameters, such as aircraft attitude, i.e., pitch, roll, and yaw, that represent the dynamics of the aircraft in simulated flight. The aircraft parameters are then communicated among the various simulation processes to enable each to carry out its dedicated purpose or function. For example, an OTW process receives the aircraft's simulated position and attitude and uses it to determine what OTW scenery to render.

It is often necessary for communication among the various simulation processes in a high-fidelity flight simulator to be carried out in real time, e.g., synchronized and low-latency, to maintain the realistic look and feel demanded of such systems. Many flight simulators utilize sophisticated communication protocols, such as, for example, reflective shared memory, e.g., ScramNet, to satisfy the real-time constraint. Sophisticated communication protocols typically require specialized hardware and software that introduces costs, complexity, and bulk to the flight simulator. Accordingly, it is realized herein, a flight simulator that is mobile, configurable for multiple aircraft, operable in real time, and affordable is desired.

BRIEF DESCRIPTION

According to one aspect of the present disclosure, a processing system for a flight simulator is provided. The processing system includes a ScramNet interface, a non-transitory memory, and a processor. The ScramNet interface is configured to establish a ScramNet bus on which ScramNet messages are transmitted and received. The non-transitory memory is configured to store computer-executable instructions for a host process and a ScramNet-to-Ethernet application programming interface (API). The processor is communicatively coupled to the ScramNet interface and the non-transitory memory, and is configured to execute the host process and the ScramNet-to-Ethernet API to: convert, using the ScramNet-to-Ethernet API, a flight control message to a first ScramNet message on the ScramNet bus, process, using the host process, the first ScramNet message to generate a second ScramNet message on the ScramNet bus, and convert, using the ScramNet-to-Ethernet API, the second ScramNet message to a display message.

According to another aspect of the present disclosure, a flight simulator is provided. The flight simulator includes an Ethernet network, a flight control system, a host processing system, and a display system. The flight control system is coupled to the Ethernet network and is configured to receive flight control inputs and transmit a flight control message over the Ethernet network. The host processing system is coupled to the Ethernet network and includes a ScramNet bus. The host processing system is configured to convert the flight control message to a first ScramNet message on the ScramNet bus, execute a host process configured to communicate on the ScramNet bus and process the first ScramNet message to generate a second ScramNet message on the ScramNet bus, and convert the second ScramNet message to a display message. The display system is coupled to the Ethernet network and is configured to receive the display message.

According to yet another aspect of the present disclosure, a method of conducting a flight simulation is provided. The method includes receiving a flight control message over an Ethernet network from a flight control system. The flight control message includes flight control inputs. The method includes converting the flight control message to a first ScramNet message and transmitting the first ScramNet message onto a ScramNet bus. The method includes executing a host process configured to gain access to the ScramNet bus and process the flight control inputs in the first ScramNet message to generate a second ScramNet message. The method includes transmitting the second ScramNet message onto the ScramNet bus. The method includes converting the second ScramNet message to a display message. The method includes transmitting the display message over the Ethernet network to a display system.

The features, functions, and advantages that have been discussed can be achieved independently in various embodiments or may be combined in yet other embodiments further details of which can be seen with reference to the following description and drawings.

DETAILED DESCRIPTION

Figure 1:
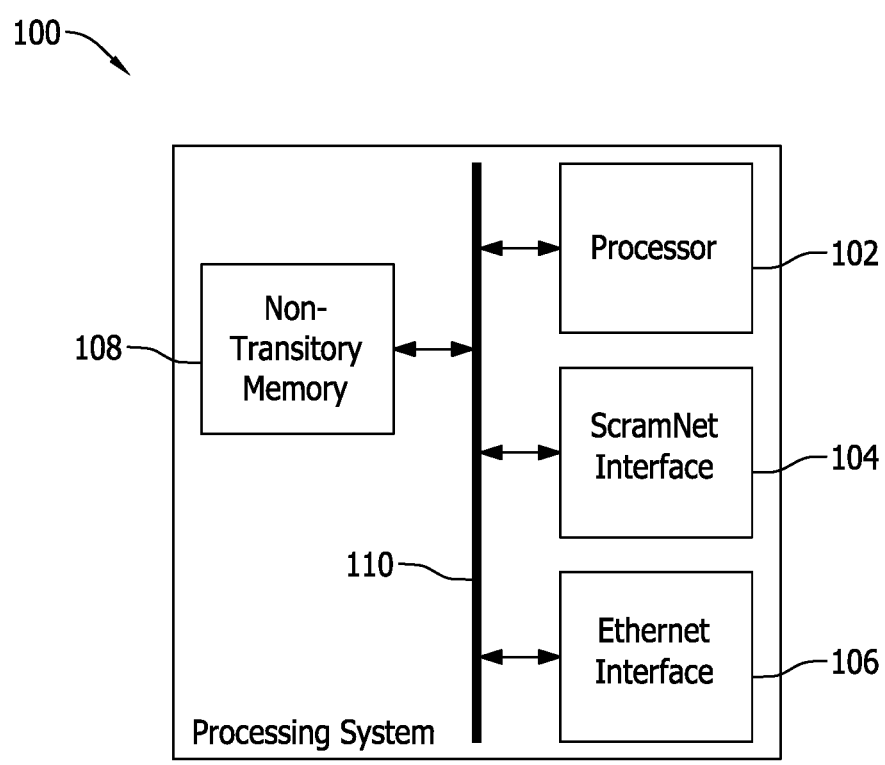
FIG. 1 is a block diagram of an exemplary processing system.

FIG. 1 is a block diagram of an exemplary processing system 100. Processing system 100 includes a processor 102, a ScramNet interface 104, an Ethernet interface 106, and a non-transitory memory 108, all of which communicate over a communication bus 110, such as, for example, peripheral component interconnect (PCI), PCI Express, PCI Extended, or any other suitable communication bus for computing systems. Processing system 100 is an exemplary system on which one or more simulation processes may execute for a flight simulator. In certain embodiments, processing system 100 executes an operating system within which other simulation processes are executed.

ScramNet interface 104 is a specialized hardware interface for an exemplary real-time communication protocol that utilizes reflective shared memory to achieve synchronized low-latency communication among processing systems and simulation processes. ScramNet interface 104 establishes a ScramNet bus (not shown) with which processor 102 communicates to transmit and receive messages, i.e., data. Transmitting data is generally referred to as putting a message on the ScramNet bus, and receiving data is generally referred to as pulling a message off the ScramNet bus. ScramNet interface 104 is further configured to communicate with remote processing systems that are enabled with their own ScramNet interface 104, i.e., that sit on the ScramNet bus. The various processing systems, such as processing system 100, that sit on the ScramNet bus are communicatively coupled over a token-ring network that may include copper connections, fiber optic connections, or any other suitable communication medium for establishing the network.

Figure 2:
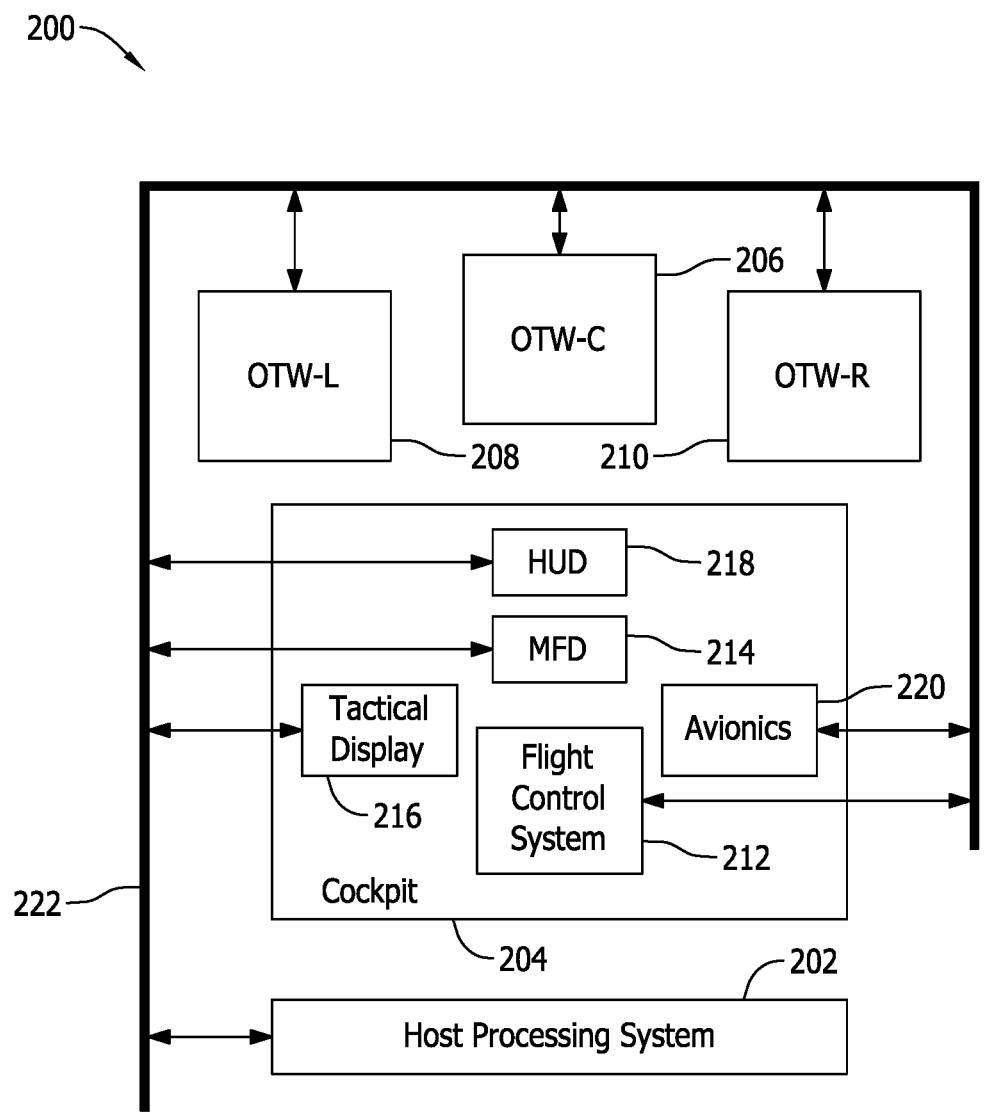
FIG. 2 is a block diagram of an exemplary flight simulator.

FIG. 2 is a block diagram of an exemplary flight simulator 200. Flight simulator 200 includes a host processing system 202 that, in certain embodiments, is implemented as processing system 100 (shown in FIG. 1). Flight simulator 200 includes a cockpit 204 and OTW display systems 206, 208, and 210, i.e., center OTW (OTW-C) 206, left OTW (OTW-L) 208, and right OTW (OTW-R) 210. Cockpit 204 includes various pilot interfaces, including a flight control system 212, an MFD 214, a tactical display 216, a HUD 218, and various other avionics 220 integrated into flight simulator 200, all of which are communicatively coupled to a real-time bus 222, such as, for example Ethernet. Each of host processing system 202, OTW display systems 206, 208, 210, flight control system 212, MFD 214, tactical display 216, HUD 218, and avionics 220 represents a simulation process executing on one or more processing system, and further represents the physical processing system or physical human interface on which its dedicated purpose or function is carried out. For example, OTW-C 206 represents a center OTW process executing on a processing system as well as the display itself on which OTW scenery is rendered. Likewise, for example, flight control system 212 represents a flight control process executing on a processing system as well as the physical flight control interfaces, e.g., stick, throttle, rudder pedals, cyclic, collective, or other flight control device, with which the pilot interfaces. For example, the pilot utilizes a stick to control pitch and roll in a fixed-wing aircraft. Likewise, the pilot may utilize rudder pedals to control yaw. In rotary aircraft, a stick or cyclic is generally used to control pitch and yaw, while a collective is used to control altitude. In either case, the throttle controls power to the engines of the aircraft, which affect airspeed. In certain embodiments, one or more of the cockpit display devices, such as, for example, MFD 214, tactical display 216, or HUD 218 may include one or more tablet computing devices, flat panel displays, or other suitable display systems operable to receive a display message and render appropriate graphics, scenery, text, or other objects.

Figure 3:
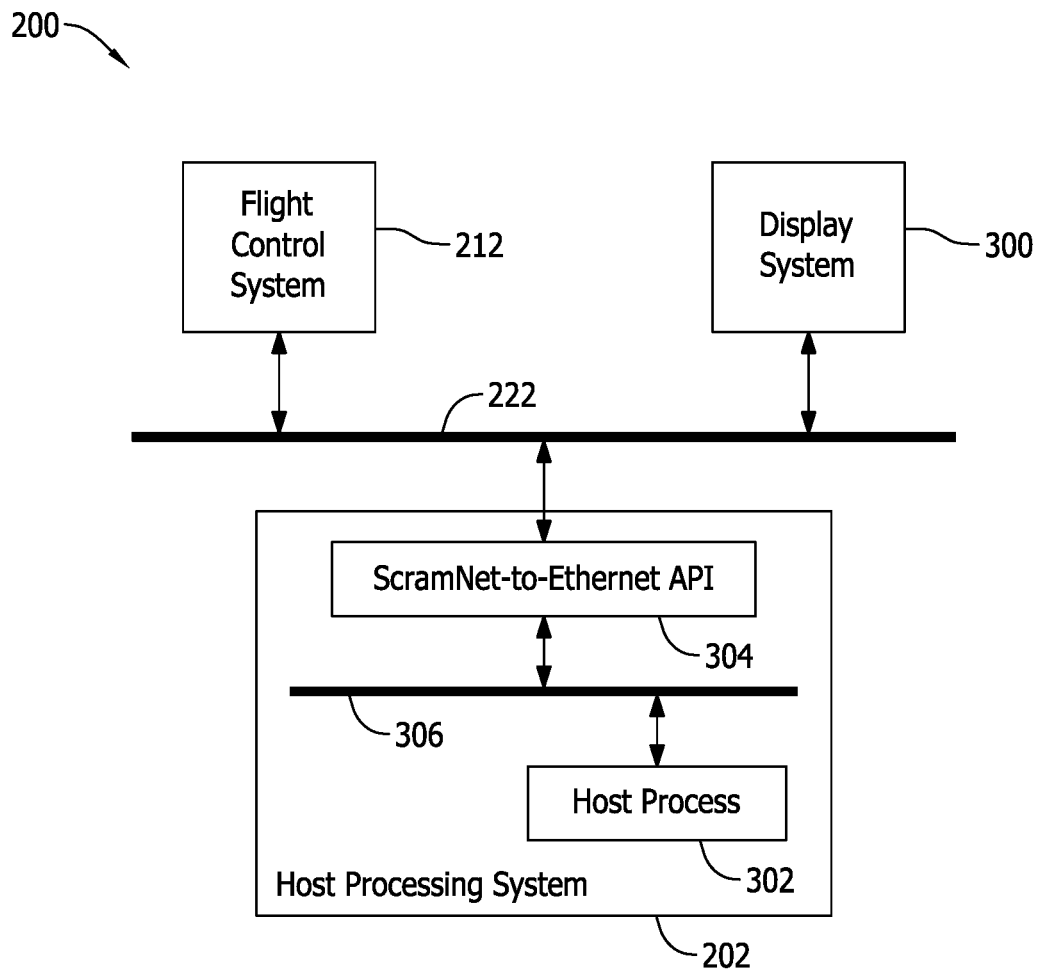
FIG. 3 is another block diagram of the flight simulator shown in FIG. 2 that utilizes both ScramNet protocols and Ethernet protocols.

FIG. 3 is another block diagram of flight simulator 200 that utilizes both ScramNet protocols and Ethernet protocols. FIG. 3 includes host processing system 202 coupled to flight control system 212 by real-time bus 222 (all shown in FIG. 2). FIG. 3 also includes a display system 300, such as, for example, OTW systems 206, 208, 210, MFD 214, tactical display 216, (all shown in FIG. 2) or any other suitable display system. Host processing system 202, flight control system 212, and display system 300 communicate using real-time bus 222 that is implemented as an Ethernet network. In such an embodiment, real-time bus 222 may further include one or more Ethernet switches, hubs, or other routing devices to enable real-time communication among various processing systems on the Ethernet network.

Flight control system 212 receives flight control input from a pilot or user of flight simulator 200 and transmits a flight control message, e.g., an Ethernet message, over real-time bus 222. Flight control input may include, for example, pitch, roll, and yaw commands. In transmitting the flight control message, flight control system 212 packs the flight control inputs into one or more Ethernet packets and transmits them to host processing system 202.

Host processing system 202 includes memory, such as, for example, non-transitory memory 108 (shown in FIG. 1) that is configured to store computer executable instructions including, for example, a host process 302 and a ScramNet-to-Ethernet application programming interface (API) 304. Host process 302 and ScramNet-to-Ethernet API 304 are simulation processes that execute on one or more processors of host processing system 202.

Host process 302 coordinates among all other simulation processes, including those executing on host processing system 202, as well as simulation processes executed on one or more remote processing system, such as a dedicated processing system for flight control system 212 or another dedicated processing system for display system 300. Host process 302 includes, for example, a math model that processes various inputs, such as, for example, flight control inputs and wind, to compute various outputs, or aircraft parameters, such as aircraft attitude, i.e., pitch, roll, and yaw, that represent the dynamics of the aircraft in simulated flight.

Host processing system 202 includes a ScramNet interface, such as ScramNet interface 104 (shown in FIG. 1), that establishes a ScramNet bus 306. In alternative embodiments, host processing system 202 may omit ScramNet interface 104, and may further implement ScramNet bus 306 within host process 302 or any other suitable process executing on host processing system 202. Host process 302 is generally configured to communicate among various simulation processes using ScramNet bus 306. Flight simulator 200 utilizes real-time bus 222, i.e., the Ethernet network, for communication among host processing system 202, flight control system 212, and display system 300. Accordingly, host processing system 202 executes ScramNet-to-Ethernet API 304 to handle conversion from real-time bus 222, i.e., the Ethernet network, to ScramNet bus 306. ScramNet-to-Ethernet API 304 enables host process 302 to operate without having to modify real-time communication protocols that utilize ScramNet bus 306. Rather, host process 302 continues to gain access to ScramNet bus 306 and transmit and receive messages, i.e., data, over ScramNet bus 306. Likewise, any other simulation processes executing on host processing system 202 or other remote processing systems, such as, for example flight control system 212 and display system 300, that utilize ScramNet protocols may also utilize ScramNet-to-Ethernet API 304 to handle conversion from real-time bus 222, i.e., the Ethernet network, to ScramNet bus 306 or any other ScramNet bus local to that processing system. For example, remote processing systems may be implemented similar to processing system 100 (shown in FIG. 1), including ScramNet interface 104 that establishes a local ScramNet bus, and Ethernet interface 106 that interfaces with real-time bus 222, e.g., the Ethernet network.

Host processing system 202 receives the flight control message over real-time bus 222, i.e., the Ethernet bus, from flight control system 212. Upon receipt, ScramNet-to-Ethernet API 304 converts the flight control message to a ScramNet message, e.g., a first ScramNet message, that is put onto, i.e., transmitted over, ScramNet bus 306. Such conversion generally includes unpacking the flight control message, i.e., the Ethernet message, into its flight control input components, and then repacking the flight control input components into the ScramNet message. ScramNet-to-Ethernet API 304 gains access to ScramNet bus 306 and the ScramNet message is then put onto ScramNet bus 306. Host process 302 gains access to ScramNet bus 306 and pulls down, i.e., receives, the ScramNet message containing the flight control inputs. Host process 302 then unpacks the ScramNet message for use within, for example, the math model for the aircraft.

As described above, host process 302 executes the math model with the flight control inputs received from flight control system 212. Host process 302 generates, as a result, aircraft parameters including, for example, position and attitude of the aircraft in simulated flight. Such aircraft parameters are packed into another ScramNet message, e.g., a second ScramNet message that is put onto, i.e., transmitted over, ScramNet bus 306. Accordingly, ScramNet-to-Ethernet API 304 gains access to ScramNet bus 306 and pulls down, i.e., receives, the second ScramNet message. ScramNet-to-Ethernet API 304 unpacks the second ScramNet message into, for example, the aircraft parameter components, and repacks the data into, for example, a display message, e.g., an Ethernet message, that is transmitted onto real-time bus 222, i.e., the Ethernet network, to display system 300.

Display system 300 includes a physical display on which graphics, scenery, text, or other objects are displayed for the pilot or user. Display system 300 also includes, in certain embodiments, a processing system dedicated for executing a display process that controls the physical display itself. Such a processing system, in certain embodiments, is configured to operate directly on the display message transmitted from host processing system 202 over real-time bus 222, i.e., the Ethernet network. In such an embodiment, display system 300 receives the Ethernet message and renders appropriate graphics according to the aircraft parameters contained therein. For example, where display system 300 includes an MFD, such as, for example, MFD 214 (shown in FIG. 2), the MFD may be configured to display a visual representation of the aircraft's position and/or attitude in simulated flight. Alternatively, in certain embodiments, display system 300 may include a ScramNet interface, such as ScramNet interface 104 (shown in FIG. 1) that establishes another ScramNet bus local to the processing system dedicated to display system 300. For example, display system 300 may include a dedicated processing system for OTW-C 206 that similarly receives the display message transmitted from host processing system 202 over real-time bus 222, i.e., the Ethernet network. In such an embodiment, display system 300 would convert the Ethernet message into another ScramNet message containing the aircraft parameters that is then put onto the local ScramNet bus where the display process may gain access and control OTW-C 206 accordingly, e.g., render OTW scenery.

Figure 4:
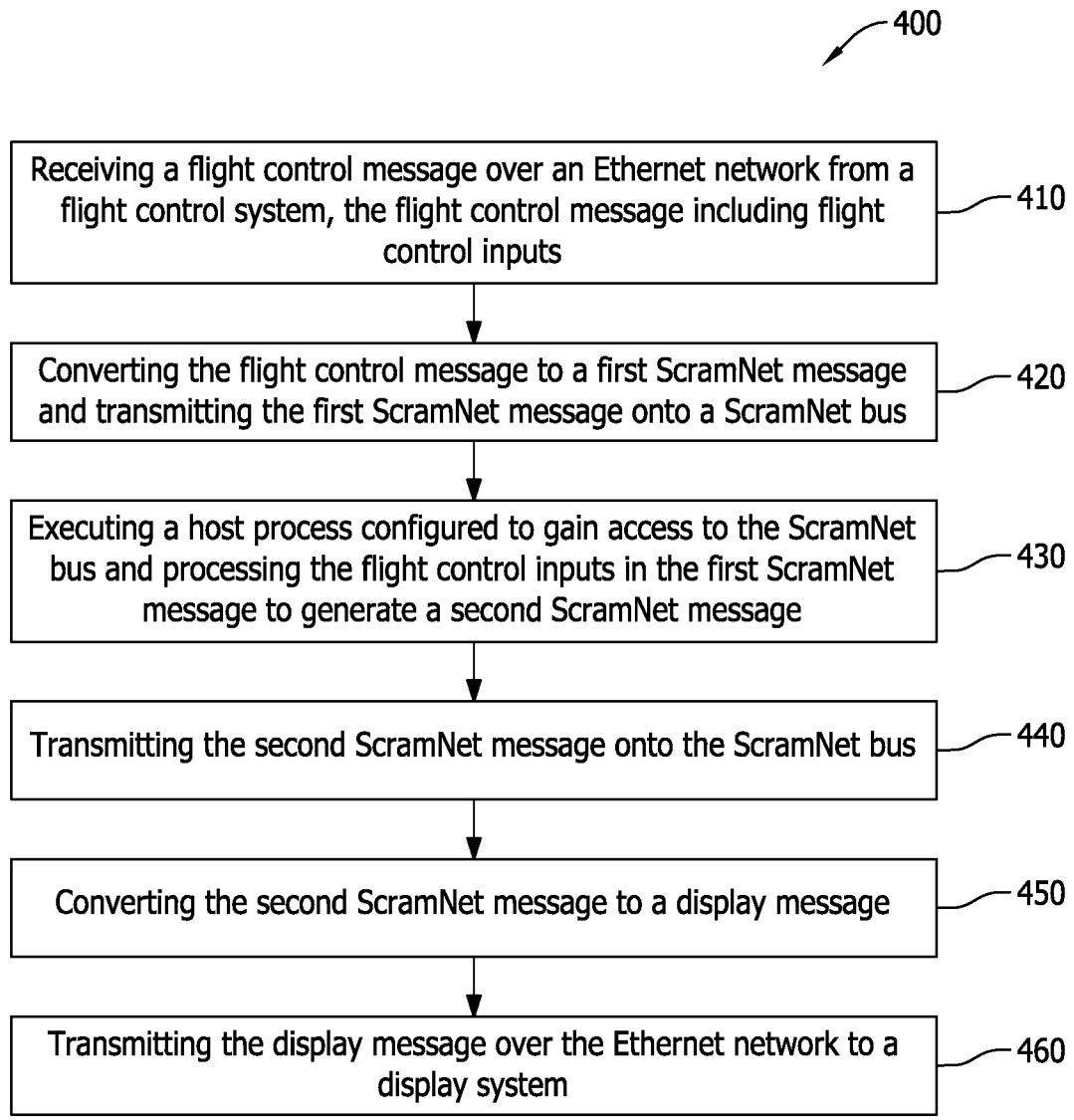
FIG. 4 is a flow diagram of an exemplary method of conducting a flight simulation.

FIG. 4 is a flow diagram of an exemplary method 400 of conducting a flight simulation using flight simulator 200 (shown in FIG. 2 and FIG. 3). Method 400 includes receiving 410 a flight control message at host processing system 202 over an Ethernet network, such as real-time bus 222, from flight control system 212. As described above, the flight control message includes flight control inputs received from the pilot or user. Method 400 includes converting 420 the flight control message to a first ScramNet message using ScramNet-to-Ethernet API 304 and transmitting the first ScramNet message onto ScramNet bus 306. Host process 302 is executed 430 on host processing system 202. Host process 302 gains access to ScramNet bus 306 and processes the flight control inputs in the first ScramNet message to generate a second ScramNet message containing, for example, aircraft parameters. The second ScramNet message is then transmitted 440 onto ScramNet bus 306 by host process 302. ScramNet-to-Ethernet API 304 then converts 450 the second ScramNet message to a display message, e.g., an Ethernet message. The display message is transmitted 460 over real-time bus, i.e., the Ethernet network, to display system 300.

The above described embodiments of the flight simulator and methods described herein provide a flight simulator that utilizes both ScramNet communication protocols and Ethernet communication protocols to achieve real-time communication among simulation processes. More specifically, embodiments described herein include a ScramNet-to-Ethernet API that converts between ScramNet messages and Ethernet messages to enable simulation processes configured to utilize ScramNet protocols to continue operating without modification. Further, the ScramNet-to-Ethernet API enables such flight simulators to utilize an Ethernet network as a real-time bus, thereby reducing complexity, cost, and bulk of specialized communication protocols that typically require specialized hardware and software.

An exemplary technical effect of the methods, systems, and apparatus described herein includes at least one of: (a) reducing complexity of real-time communications; (b) reducing cost of processing systems for flight simulators by elimination of specialized hardware and software; (c) improving mobility and configurability of flight simulators by elimination or reduction of specialized hardware; and (d) improving configurability of flight simulators by simplification of real-time communication protocols.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A processing system, comprising:
   a non-transitory memory configured to store computer-executable instructions for a host process and a ScramNet-to-Ethernet application programming interface (API); and
   a processor communicatively coupled to a ScramNet interface and the non-transitory memory, and configured to execute the host process and the ScramNet-to-Ethernet API to:
      convert, using the ScramNet-to-Ethernet API, a pilot interface message to a first ScramNet message for transmission via a ScramNet bus; and
      process, using the host process, the first ScramNet message to generate a second ScramNet message for transmission via the ScramNet bus.

2. The processing system of claim 1 further comprising an Ethernet interface configured to be coupled to an Ethernet network, and further configured to receive the pilot interface message from a pilot interface.

3. The processing system of claim 2, wherein the processor, in executing the host process, is further configured to access the first ScramNet message via the ScramNet bus and process pilot inputs from the first ScramNet message.

4. The processing system of claim 3, wherein the processor, in executing the host process, is further configured to compute, based on the pilot inputs, aircraft parameters that are employed for generating the second ScramNet message for transmission via the ScramNet bus.

5. The processing system of claim 4, wherein the processor, in executing the ScramNet-to-Ethernet API, is further configured to:
   access the second ScramNet message via the ScramNet bus;
   unpack the aircraft parameters from the second ScramNet message; and
   repack the aircraft parameters into a display message for rendering via a display device.

6. The processing system of claim 3, wherein the processor, in executing the ScramNet-to-Ethernet API, is further configured to:
- unpack the pilot inputs from the pilot interface message;
- repack the pilot inputs into the first ScramNet message; and
- transmit the first ScramNet message onto the ScramNet bus.

7. The processing system of claim 2, wherein the processor, in executing the host process, is further configured to convert, using the ScramNet-to-Ethernet API, the second ScramNet message to a display message, and wherein the Ethernet interface is further configured to transmit the display message to the pilot interface.

8. The processing system of claim 2 further comprising a communication bus coupled to said ScramNet interface, said Ethernet interface, and said processor.

9. A computer-readable memory storing computer executable instructions for a host process and a ScramNet-to-Ethernet application programming interface (API) that, upon execution by a processor, configure the processor to:
- receive a user interface message from an Ethernet interface, wherein the user interface message comprises user input data;
- convert the user interface message to a first ScramNet message and transmit the first ScramNet message onto a ScramNet bus;
- access the ScramNet bus and process the user input data in the first ScramNet message to generate a second ScramNet message; and
- transmit the second ScramNet message via the ScramNet bus.

10. The computer-readable memory of claim 9, wherein the host process and the ScramNet-to-Ethernet API are further configured to:
- convert the second ScramNet message to a display message; and
- facilitate a presentation of the display message by directing the display message to a display system via the Ethernet interface for transmission over an Ethernet network.

11. The computer-readable memory of claim 9, wherein the host process and the ScramNet-to-Ethernet API are further configured to determine, based on the user input data, one or more parameters utilized to generate the second ScramNet message for transmission via the ScramNet bus.

12. The computer-readable memory of claim 11, wherein the ScramNet-to-Ethernet API is further configured to:
- access the second ScramNet message via the ScramNet bus;
- unpack the one or more parameters from the second ScramNet message; and
- repack the one or more parameters into a display message for rendering via a display system.

13. The computer-readable memory of claim 11, wherein the ScramNet-to-Ethernet API is further configured to:
- unpack the user input data from the user interface message;
- repack the user input data into the first ScramNet message; and
- transmit the first ScramNet message onto the ScramNet bus.

14. The computer-readable memory of claim 13, wherein the user input data comprise one or more flight control inputs, and wherein the host process is further configured to compute one or more aircraft parameters, based on the one or more flight control inputs, for generating the second ScramNet message for transmission via the ScramNet bus.

15. The computer-readable memory of claim 13, wherein the user input data comprise one or more touchscreen inputs, and wherein the host process is further configured to compute the one or more parameters, based on the one or more touchscreen inputs, for generating the second ScramNet message for transmission via the ScramNet bus.

16. A method comprising:
- receiving a user interface message over an Ethernet network from a user interface, wherein the user interface message comprises user inputs;
- converting the user interface message to a first ScramNet message and transmitting the first ScramNet message onto a ScramNet bus;
- executing a host process configured to gain access to the ScramNet bus and process the user inputs in the first ScramNet message to generate a second ScramNet message; and
- transmitting the second ScramNet message onto the ScramNet bus.

17. The method of claim 16, further comprising:
- converting the second ScramNet message to a display message; and
- transmitting the display message over the Ethernet network to a display system wherein executing the host process further comprises processing the user inputs to compute vehicle parameters.

18. The method of claim 17 further comprising:
- receiving the display message over the Ethernet network at the display system; and
- rendering out-the-window (OTW) scenery graphics based on the display message.

19. The method of claim 16, wherein converting the user interface message comprises:
- unpacking, according to an Ethernet protocol, the user inputs from the user interface message; and
- repacking the user inputs into the first ScramNet message.

20. The method of claim 17, wherein converting the second ScramNet message comprises:
- gaining access to the ScramNet bus;
- unpacking parameters from the second ScramNet message; and
- repacking, according to an Ethernet protocol, the parameters into the display message.

* * * * *